US012698665B2

(12) United States Patent
Volkun et al.

(10) Patent No.: US 12,698,665 B2
(45) Date of Patent: Aug. 4, 2026

(54) ADJUSTABLE RETRACTION MECHANISM

(71) Applicant: ELVO LTD, Kiryat Bialik (IL)

(72) Inventors: Eli Volkun, Kiryat Bialik (IL); Lidor Shalom Elharar, Afula (IL)

(73) Assignee: ELVO LTD, Kiryat Bialik (IL)

( * ) Notice: Subject to any disclaimer, the term of this patent is extended or adjusted under 35 U.S.C. 154(b) by 62 days.

(21) Appl. No.: 18/698,079

(22) PCT Filed: Nov. 23, 2022

(86) PCT No.: PCT/IL2022/051247
§ 371 (c)(1),
(2) Date: Apr. 3, 2024

(87) PCT Pub. No.: WO2023/100171
PCT Pub. Date: Jun. 8, 2023

(65) Prior Publication Data

US 2025/0237101 A1 Jul. 24, 2025

Related U.S. Application Data

(60) Provisional application No. 63/285,229, filed on Dec. 2, 2021.

(51) Int. Cl.
*E05F 1/16* (2006.01)
*E05D 13/00* (2006.01)

(52) U.S. Cl.
CPC ................ *E05F 1/16* (2013.01); *E05D 13/00* (2013.01); *E05D 13/1292* (2013.01);
(Continued)

(58) Field of Classification Search
CPC .. E05F 1/16; E05Y 2201/26; E05Y 2201/484; E05Y 2201/654; E05D 13/00; E05D 13/1292
(Continued)

(56) References Cited

U.S. PATENT DOCUMENTS 216,688 A * 6/1879 Love ........................ E05F 1/16 16/78
274,397 A * 3/1883 Sherer ...................... E05F 1/16 16/78
(Continued)

FOREIGN PATENT DOCUMENTS

EP 2395195 A2 * 12/2011 ................ E05F 1/16
FR 2904852 A1 2/2008
JP 2013204391 A 10/2013

OTHER PUBLICATIONS

PCT International Search Report for International Application No. PCT/IL2022/051247, mailed Mar. 13, 2023, 3pp.
(Continued)

*Primary Examiner* — Jeffrey O'Brien
(74) *Attorney, Agent, or Firm* — The Roy Gross Law Firm, LLC; Roy D. Gross

(57) ABSTRACT

An adjustable retraction mechanism includes a main housing, the main housing includes a cord wrapped around a torsion spring and rigidly attached thereto at one end thereof. The retraction mechanism further includes an adjustable cord friction mechanism configured for reducing a force applied on the cord. The friction mechanism includes at least one adjustable pressing member which applies a friction force on the cord.

11 Claims, 7 Drawing Sheets

(52) U.S. Cl.
CPC ..... *E05Y 2201/26* (2013.01); *E05Y 2201/484* (2013.01); *E05Y 2201/654* (2013.01); *E05Y 2900/132* (2013.01)

(58) Field of Classification Search
USPC ..................................................... 16/76
See application file for complete search history.

(56) References Cited

U.S. PATENT DOCUMENTS 363,253 A * 5/1887 Nelson ..................... E05F 1/16 16/78
397,941 A * 2/1889 Rosentreter ............ E05D 13/00 16/DIG. 16
429,941 A * 6/1890 McArthur .............. E05D 13/00 16/198
456,277 A * 7/1891 Pennington ............ E05D 13/00 24/134 R
509,587 A * 11/1893 Seely ..................... E05D 13/00 16/198
1,662,722 A * 3/1928 Smith .................. E05F 11/483 16/198
2,797,435 A * 7/1957 Decker .............. E05D 13/1292 242/375
2,992,450 A * 7/1961 Pittenger .................. E05F 1/16 160/192
3,020,580 A * 2/1962 Glenn ....................... E05F 3/16 16/61
3,045,276 A * 7/1962 Schwarz .................. E05F 1/16 242/375
3,246,363 A * 4/1966 Rogas ....................... E05F 1/16 160/192
3,267,513 A * 8/1966 Wartian .................... E05F 3/02 16/84
3,332,638 A * 7/1967 Matthews .......... B65H 75/4442 188/77 R
3,480,227 A * 11/1969 Matthews ................. E05F 1/16 188/82.6
3,502,280 A * 3/1970 Matthews ................. E05F 1/16 188/82.6
4,004,372 A * 1/1977 Beard ....................... E05F 1/16 49/404
5,937,478 A * 8/1999 Regnier .................... E05F 1/16 16/77
6,021,607 A * 2/2000 Angove .................... E05F 1/16 49/404
2010/0031469 A1* 2/2010 Chiang .................. E05F 5/003 16/64

OTHER PUBLICATIONS

PCT Written Opinion for International Application No. PCT/IL2022/051247, mailed Mar. 13, 2023, 6pp.

* cited by examiner

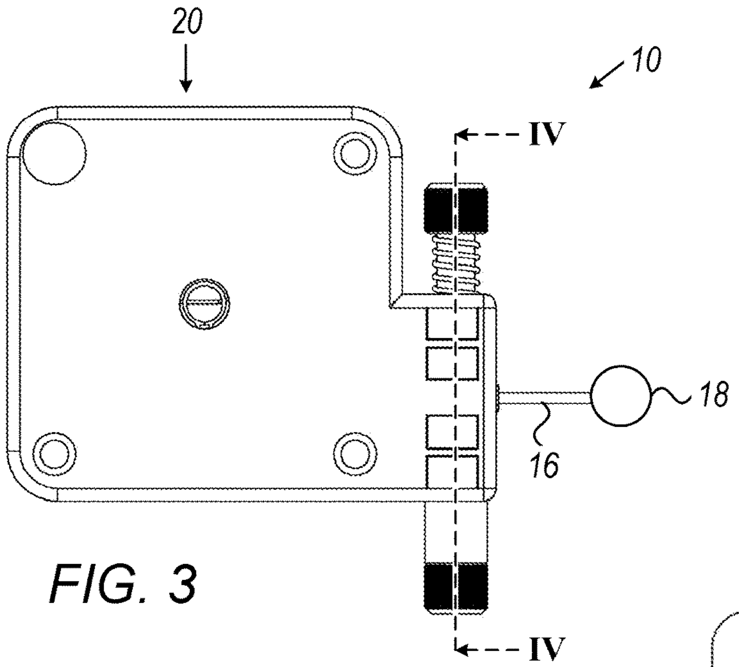
FIG. 3
FIG. 4
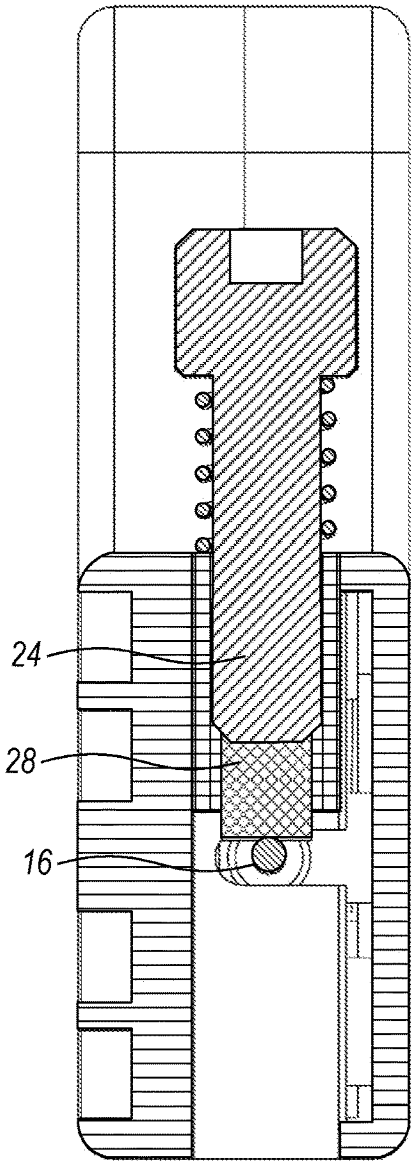

ADJUSTABLE RETRACTION MECHANISM

CROSS REFERENCE TO RELATED APPLICATIONS

This application is a National Phase of PCT Patent Application No. PCT/IL2022/051247 having International filing date of Nov. 23, 2022, which claims the benefit of priority of U.S. Provisional Patent Application No. 63/285,229, filed Dec. 2, 2021, the contents of which are all incorporated herein by reference in their entirety.

FIELD OF THE INVENTION

The subject matter of the current application relates to retraction mechanisms for closing doors. It specifically relates to cord retraction mechanisms based on a flat, spiral wound torsion spring, or clock spring as it is sometimes referred to.

BACKGROUND OF THE INVENTION

Patents and products relating to the field of invention, or door closers as they are sometimes referred to, have been known for more than 80 years. One example for such mechanism is disclosed by U.S. Pat. No. 2,992,450. A main disadvantage of such a mechanism is that it doesn't include an adjustment option. For example—a sliding door is rigidly connected to a cord at one end thereof, and at the other end connected to a spiral spring within a door closer mechanism. Once the door is at least partially opened by a user—by pushing the door away from the door closer, the cord is pulled and therefore loads the spring. Once the user stops pushing the door away from the door closer, the loaded spring pulls the cord back and the door is therefore accelerated into a closed position. The door speed increases either until it reaches a final velocity, depending on total system friction or until it impacts the end of the track or the wall. The sound generated by the impact is an unwanted disadvantage due to the normally unexpected high auditory volume, but also for mechanical reasons, such as general mechanisms wear. For example, the vibrations may cause various parts loosen and/or be worn or even break. A further disadvantage is related to safety—the higher the door speed is, the risk of injury increases as well.

Different doors can be made of different materials, and therefore can have different weight values. Therefore, an even further major disadvantage of retraction mechanisms known thus far, is that the spring is in a zero-energy, or close to zero, equilibrium. In other words, it is normally set up with no preload, and energy is loaded into the spring only by opening the door which pulls the cord. It is therefore capable of handling only a certain, small range of forces, which consequently results in a small range of weights of doors that the retraction mechanism can handle. Furthermore, the maximum force value is determined partially by the length of the cord which is pulled, which, as a result, is determined mostly by the width of the doorway.

The current retraction mechanism is aimed to solve at least the abovementioned problems.

SUMMARY OF THE INVENTION

In accordance with a first aspect according to the subject matter of the present application there is provided an adjustable retraction mechanism comprising a main housing, the main housing comprising:

- a cord wrapped around a torsion spring and rigidly attached thereto at one end thereof; and
- an adjustable cord friction mechanism configured for reducing a pulling force applied on the cord by the spring, the friction mechanism comprising at least one adjustable pressing member applying a friction force on the cord.

The retraction mechanism can include an adjustable preload mechanism.

The preload mechanism can include a winding member which includes at least two fixation interfaces and a fixation member located in one of the fixation interfaces.

The winding member has a winding connector which is rigidly and directly connected to the spring at its center.

The main housing can include at least one fixation interface.

The pressing member can include a replaceable contact member which contacts the cord to apply friction in a perpendicular direction to the cord length direction.

The pressing member can be a male screw which comprises a male thread engaged with an internal female thread of a bushing rigidly secured within the main housing.

The bushing can be made of metal.

The cord friction mechanism can include unscrewing prevention means configured to prevent rotational movement of the pressing member.

The pressing member can be made of metal.

The cord friction mechanism can include exactly two pressing members.

The retraction mechanism can further include a spring housing located between the spring and the cord, the spring is located within and attached to the spring housing and the cord is wrapped around, and attached at one end, to the spring housing.

The spring can be made of metal.

The cord can be made of metal.

The main housing can be made of plastic.

The at least one adjustable pressing member and the at least one bushing can be both made of metal.

The retraction mechanism can include exactly two bushings and two respective pressing members.

BRIEF DESCRIPTION OF THE DRAWINGS

For a better understanding of the subject matter of the present application and to show how the same may be carried out in practice, reference will now be made to the accompanying drawings, in which:

FIG. 3 is a side view of the retraction mechanism of FIG. 1;

FIG. 4 is a cross-section view taken along line IV-IV of FIG. 3;

Figure 1:
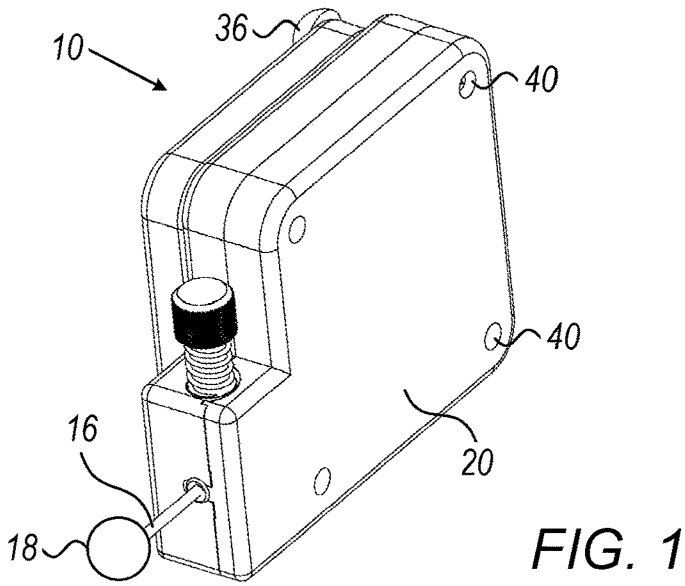
FIG. 1 is an isometric view of an adjustable retraction mechanism with an adjustable cord retraction mechanism with a single pressing member.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without some specific configurations and details presented herein.

Reference is made to FIGS. 1 to 4. An adjustable retraction mechanism 10 is configured mainly for pulling and thereby closing sliding doors and/or nets or net frames. The retraction mechanism 10 is configured to close the door/net by pulling a cord 16 which is preferably releasably connected to the door. The retraction mechanism 10 is designed mainly to pull and close sliding doors and/or nets, however, it can also be used for winged or pivoting doors. The retraction mechanism 10 has a spring 14 which is initially configured to be at a steady equilibrium. When the door is opened, the door pulls the cord 16 and therefore loads the spring 14.

The retraction mechanism 10 includes either an adjustable a cord friction mechanism 22, or an adjustable spring preload mechanism 32, or preferably both. The friction mechanism 22 is configured to adjustably reduce the pulling force applied to the cord 16. The preload mechanism 32 is configured to increase the force of the spring 14 applied to the cord 16. As will be further disclosed below, the user's ability to advantageously adjust and fine-tune the force that pulls the door/net enables closing the door with less noise and reduce overall wear to the door and its mechanisms. It can also be expected that over time, the retraction mechanism contributes to less wear on the door compared to manual door closing.

The retraction mechanism, or door closer 10, includes a main housing 20 and a spring housing 12 located within the main housing 20. The main housing 20 is preferably made of plastic. The spring housing 12 includes within it, a flat spiral torsion spring 14. The retraction mechanism further has a cord 16 which is wrapped around the spring housing 12. The spring 14 is preferably made of metal. The cord can be made of braded steel wires, or any suitable, wear—resistant material. At one end thereof, the cord 16 is rigidly attached/connected to spring housing 12. The cord 16 is therefore indirectly connected to torsion spring 14. At the other end, the cord is rigidly connected to an attachment member 18. One example for such an attachment member 18 is a round ring which is designed to be removably attached to, e.g., a hook on a door or sill.

According to preferred embodiments, the retraction mechanism 10 further includes the adjustable friction mechanism 22 located within the main housing 20. In accordance with a first embodiment, the friction mechanism 22 includes, a single pressing member 24 which is configured to apply a force on the cord 16 in a perpendicular direction thereto. The pressing member 24 can be a male screw with a male thread.

According to the present embodiment, the main housing 20 includes a bushing 26 with a female thread corresponding to the male thread of the pressing member 24. The bushing 26 is preferably made of metal. The pressing member 24 can include an unscrewing prevention means 30, such as a holding nut. The unwinding prevention means 30 can also be a spring located between, and pressing against, the bushing 26 at one end thereof, and against the head of the screw 24 at the other end. The purpose of the unscrewing prevention means 30 is to prevent unwanted rotation of the screw 24 which leads to reduction in friction and therefore increased pulling force of the retraction mechanism 10.

Figure 2:
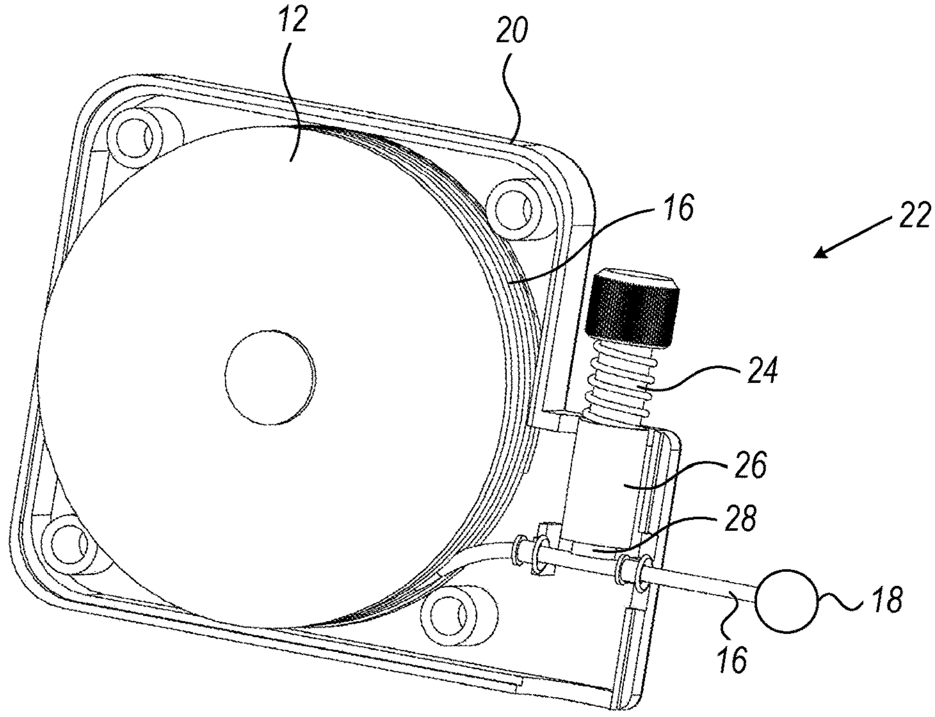
FIG. 2 is an isometric view of the retraction mechanism of FIG. 1 in which a portion of a main housing is removed.
Figure 5:
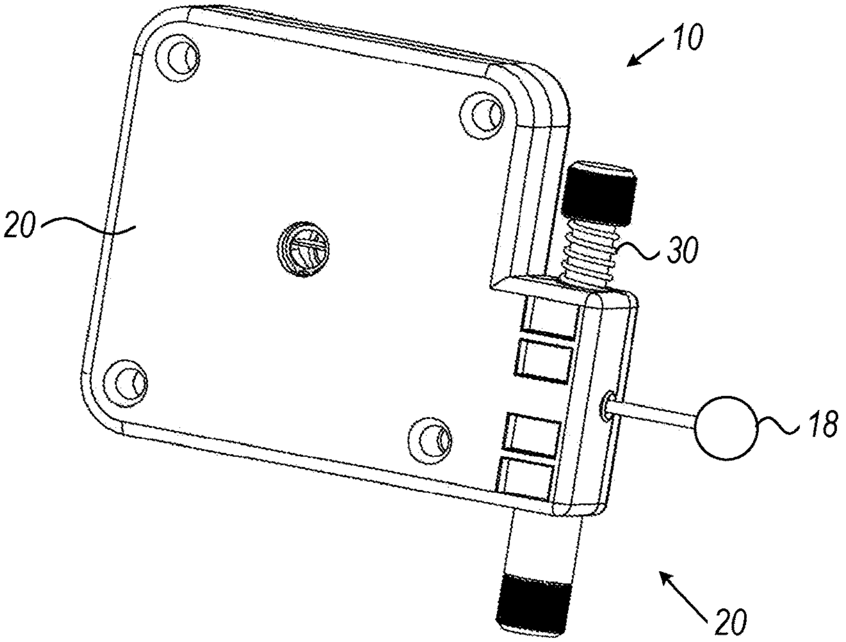
FIG. 5 is an isometric view of a retraction mechanism with an adjustable cord friction mechanism with two opposite pressing members pressing a cord against each other.

According to the present embodiments, the cord friction mechanism 22, and specifically the pressing member 24, includes a replaceable contact member 28. The contact member 28 can be located within the bushing 26, between the pressing member 24 and the cord 16. The contact member 28 is pressed against the cord 16 by the pressing member 24 as seen in FIGS. 2 and 4. One purpose and advantage of having a replaceable contact member 28 is to prevent wear on the pressing member 24. An additional advantage is the ability to change the amount of friction force applied on the cord by using a contact member 28 made from a different material. One preferred use of the pressing members 24 is to replace the contact member 28.

Figure 6:
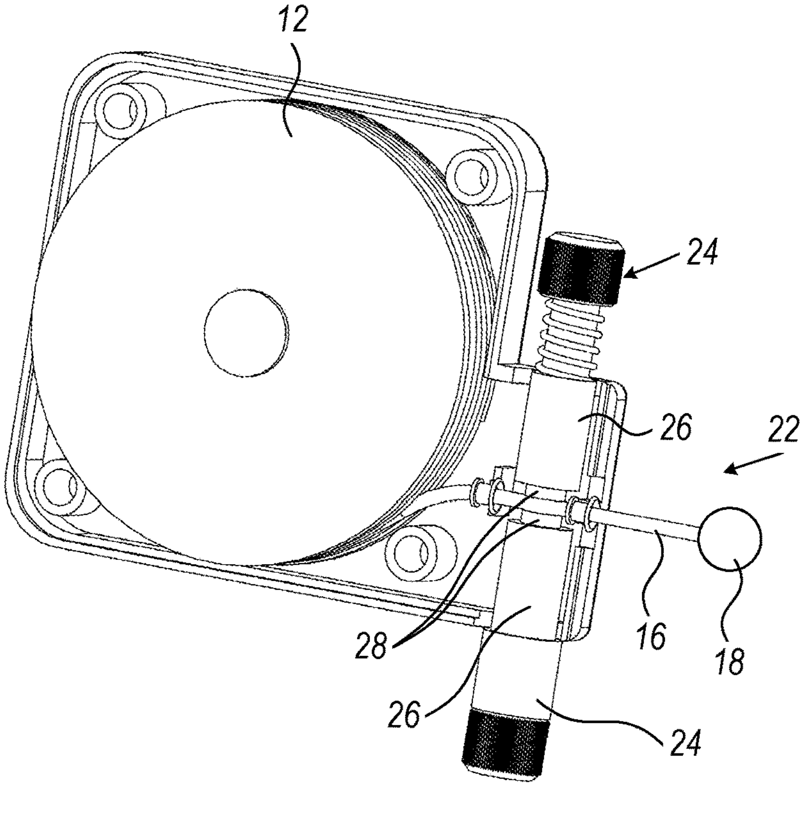
FIG. 6 is an isometric view of the retraction mechanism of FIG. 5 in which a portion of the main housing is removed to reveal the inner members.
Figure 7:
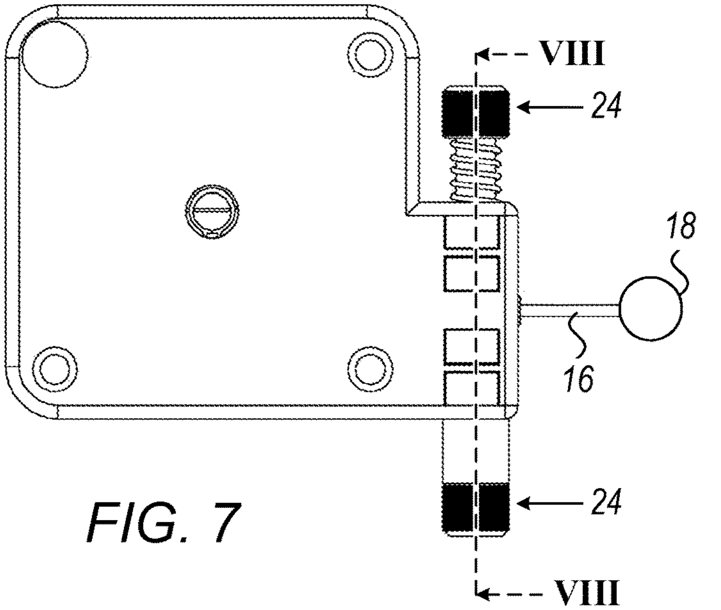
FIG. 7 is a side view of the retraction mechanism of FIG. 5.
Figure 8:
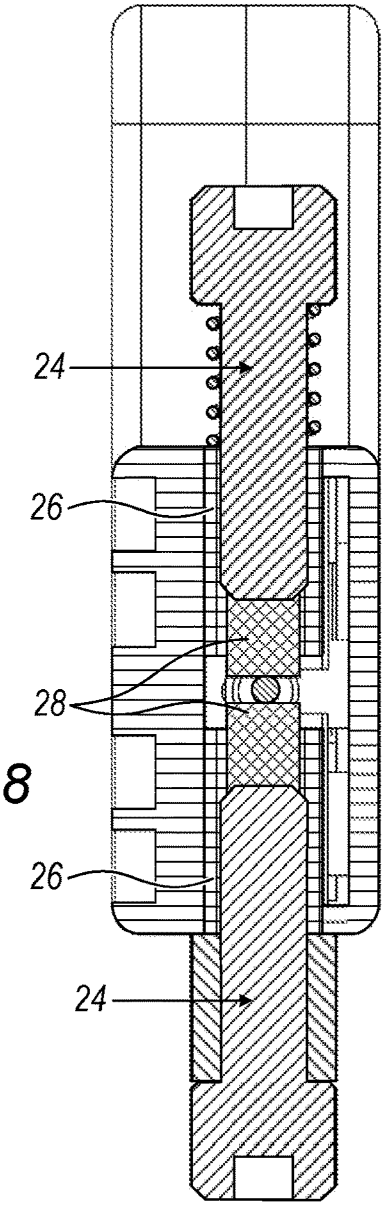
FIG. 8 is a cross-section view taken along line VIII-VIII of FIG. 7.
Figure 9:
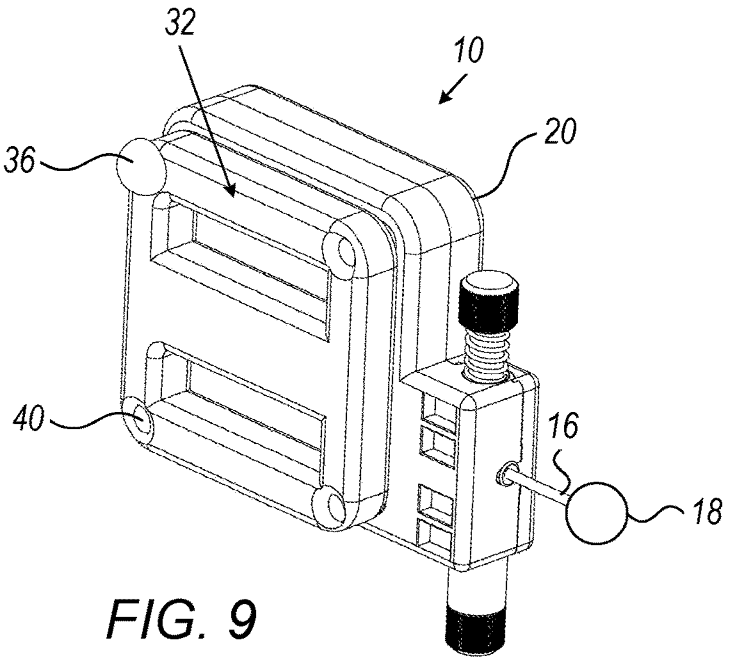
FIG. 9 is an isometric view of an embodiment of an adjustable retraction mechanism.
Figure 10:
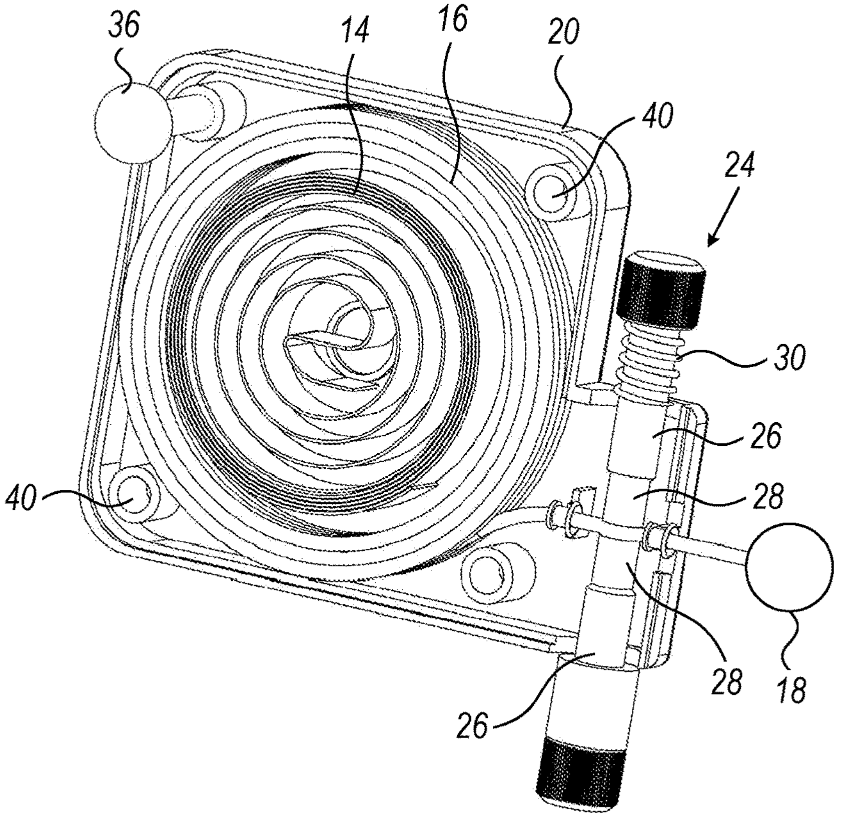
FIG. 10 is an isometric view of the retraction mechanism of FIG. 9 with half of a main housing, and a spring housing removed, while showing a fixation member located in a fixation interface of the main housing, and showing a cord friction mechanism.

Reference is made to FIGS. 5 to 8. In accordance with a second embodiment, the adjustable friction mechanism 22 includes two pressing members 24 which are located opposite of each other. The adjustable pressing members 24 are configured to apply a force on the cord 16. Specifically, a friction force. The adjustable pressing members 24 are preferably configured to apply the force on the cord in opposite directions thereby increasing the friction force applied on the cord 16. The adjustable pressing members 24 are also configured to apply the force in a perpendicular direction to a length direction of the cord 16 as seen in FIGS. 6 and 8.

According to the present embodiments and as illustrated in FIGS. 5 to 8, the main housing 20 includes two bushings 26 located opposite of each other, each having a female thread corresponding to the male threads of the pressing members 24.

According to the present embodiments, the friction mechanism 22 includes two contact members 28 and two pressing members 24 respectively. Each contact member 28 is located within a respective bushing 26, between the pressing member 24 and the cord 16. Each contact member 28 is pressed against the cord 16 by the pressing member 24. According to a preferred method of using the friction mechanism 22, a user will screw one of the pressing members 24, while the other remains in a single position.

Attention is drawn to FIGS. 9 to 14. According to preferred embodiments, the adjustable retraction mechanism 10 includes an adjustable preload mechanism 32. The preload mechanism 32 enables the retraction mechanism to apply a larger force on the cord 16. This is achieved by creating, and optionally increasing, a load on the spring 14. The preload mechanism can only increase the force of the retraction mechanism 10. As previously mentioned, the spring is initially unloaded at a steady equilibrium. However, some doors may require a larger force than the amount which is loaded into the spring just by opening the door, and pulling the cord. Therefore, adjusting the retraction mechanism 10 by increasing the initial load (preload) on the spring 14 using the preload mechanism 32 enables automatically closing heavier doors or ones with e.g., increased system friction.

Figure 11:
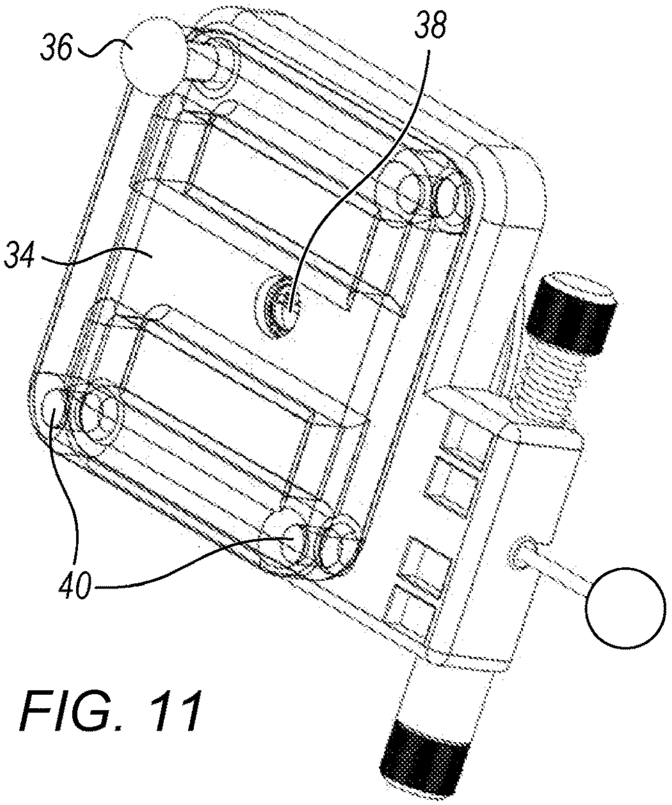
FIG. 11 is an isometric view of the retraction mechanism of FIG. 9 with a transparent winding member showing the fixation member located in both of the fixation interfaces of the main housing and the winding member.
Figure 12:
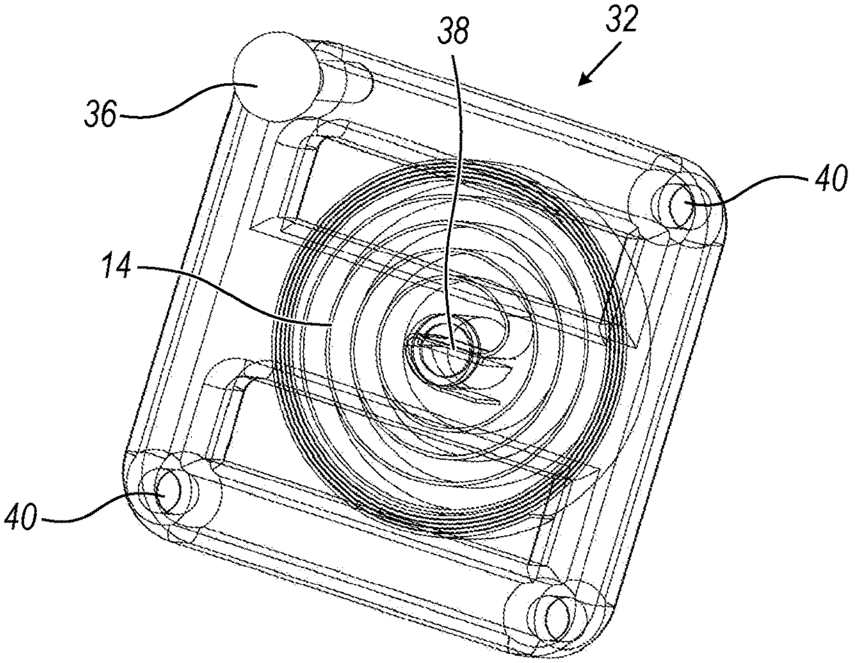
FIG. 12 is an isometric transparent view of the winding member rigidly and directly connected to a torsion spring via a winding connector.

The preload mechanism 32 includes a winding member 34 and a removable fixation member 36 configured to fix and prevent rotation of the winding member 34. The winding member 34 is rotationally connected to the main housing 20. In other words, the winding member 34 has one degree of freedom (rotation) with respect to the main housing 20. The winding member 34 has a winding connector 38, via which it is rigidly and directly connected to the torsion spring 14 at its center. The winding member 34 rotates about the center of the spring 14. The winding connector 38 passes through an opening in the main housing 20 as seen in FIGS. 11 and 12 showing a transparent winding member 34. The winding member 34 has at least two fixation interfaces 40, or holes. The main housing 20 includes at least one fixation interface 40 or hole.

The fixation member 36, can have an elongated, pin like, shape. A portion of the fixation member 36 is located within one of the fixation interfaces 40 of the winding member 40 and another portion of the fixation member 36 is located within a fixation interface 40 of the main housing 20, thereby preventing said rotation of the winding member 34 with respect to the main housing 20.

Figure 13:
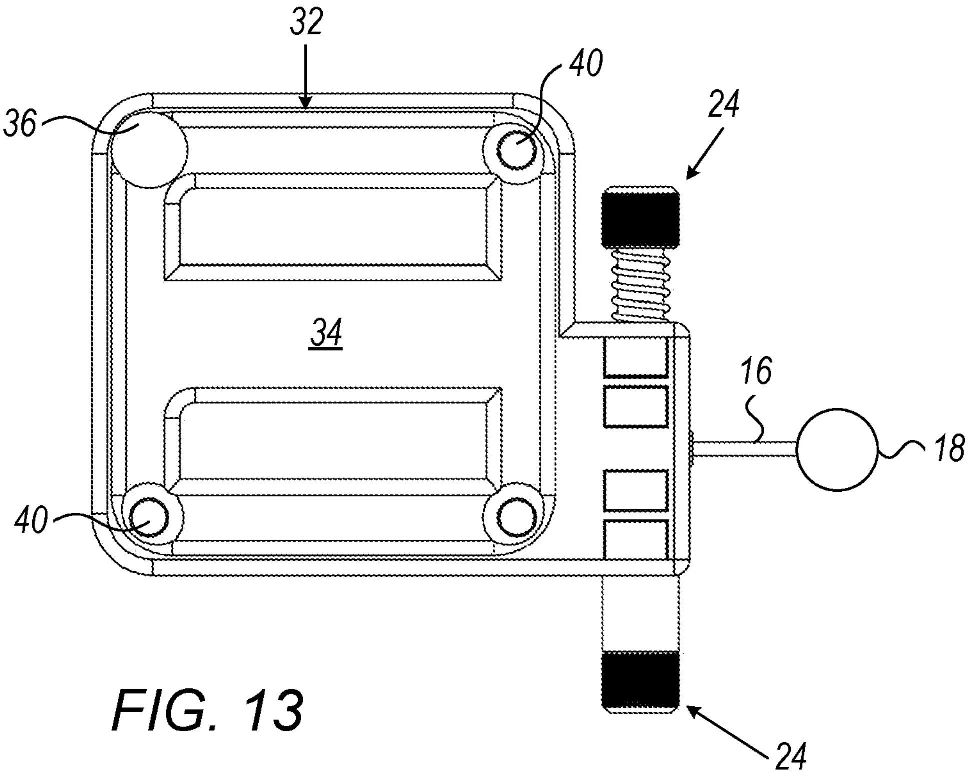
FIG. 13 is a side view of the retraction mechanism of FIG. 9 with the preload mechanism in a disabled position.
Figure 14:
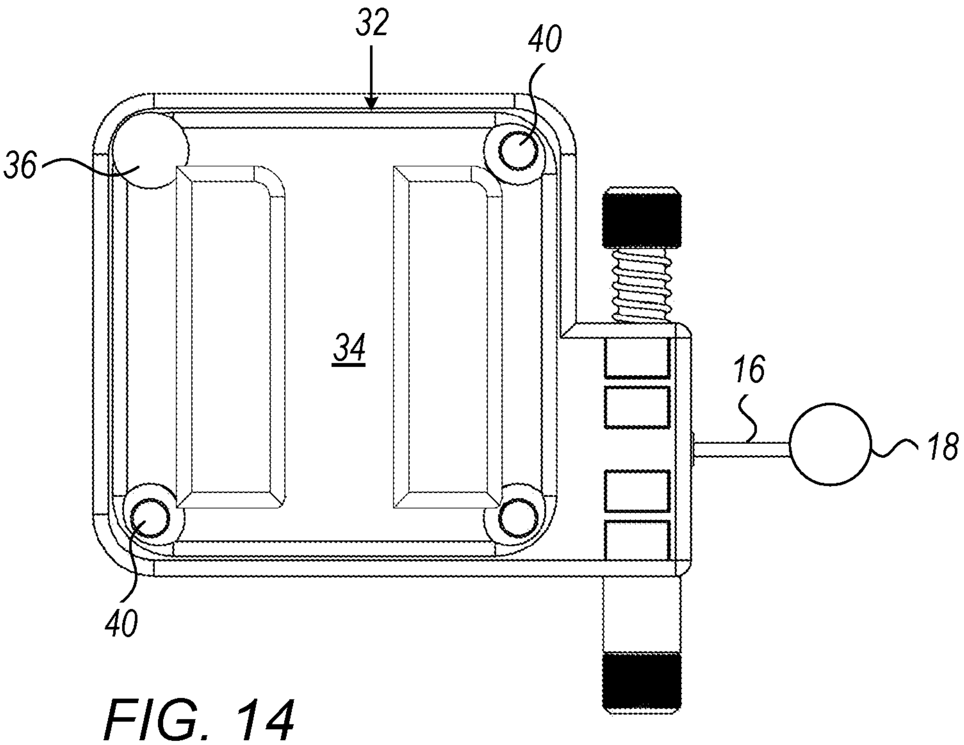
FIG. 14 is a side view of the retraction mechanism of FIG. 9 with the preload mechanism in an enabled position and a winding member in a second rotational position.

Attention is drawn to FIGS. 13 and 14. There are illustrated two positions of the winding member 34 in respective disabled and enabled positions of the preload mechanism 32. In other words, in the disabled position the spring is unwound, and in the enabled position, or any rotation to wind the spring 14, energy is loaded into the spring 14. To clarify, the enabled position can be achieved with, e.g., at least one 90 degree turn of the winding member 34.

In FIG. 13 the preload mechanism 32 is in the disabled position. the spring 14 is unloaded and the winding member 34 is in a first rotational position with respect to the main housing 20. The fixation member 36 is located in a first fixation interface 40 of the winding member 34 and located in a fixation interface 40 of the main housing 20.

In FIG. 14 the preload mechanism 32 is in the enabled position. the spring 14 is preloaded and the winding member 34 is in a second rotational position with respect to the main housing 20. The fixation member 36 is located in a second, or different, fixation interface 40 of the winding member 34 and located in the same fixation interface 40 of the main housing 20 as in the disabled position. This setup advantageously allows the user to adjust the retraction mechanism 10 for larger, heavier doors. However, if, e.g., the rotation of the winding member 34 enables too much energy, the user has the option of using the cord friction mechanism 22 to fine tune and adequately reduce the pulling force by inducing more friction onto the cord 16.

The invention claimed is:

1. An adjustable retraction mechanism (10) comprising:
a main housing (20), the main housing (20) comprising:
a cord (16) wrapped around a torsion spring (14) and rigidly attached thereto at one end thereof;
an adjustable cord friction mechanism (22) configured for reducing a pulling force applied on the cord (16) by the spring (14), the friction mechanism (22) comprising at least one adjustable pressing member (24) applying a friction force on the cord (16), wherein the at least one adjustable pressing member (24) comprises a replaceable contact member (28) which contacts the cord (16);
a spring housing (12) located between the spring (14) and the cord (16), the spring (14) is located within and attached to the spring housing (12) and the cord is wrapped around, and attached at one end, to the spring housing (12), wherein the spring housing (12) is fully enclosed within the main housing (20); and
an adjustable preload mechanism (32), wherein the preload mechanism (32) comprises a winding member (34) which comprises at least two fixation interfaces (40) and a fixation member (36) located in one of the fixation interfaces (40).

2. The adjustable retraction mechanism (10) according to claim 1, wherein the winding member (34) is rigidly and directly connected to the spring (14) via a winding connector (38).

3. The adjustable retraction mechanism (10) according to claim 1, wherein the main housing (20) further comprises at least one fixation interface (40).

4. The adjustable retraction mechanism (10) according to claim 1, wherein the pressing member (24) is a male screw which comprises a male thread engaged with an internal female thread of a bushing (26) rigidly secured within the main housing (20).

5. The adjustable retraction mechanism (10) according to claim 4, wherein the bushing (26) is made of metal.

6. The adjustable retraction mechanism (10) according to claim 1, wherein the cord friction mechanism (22) comprises unscrewing prevention means (30) configured to prevent rotational movement of the pressing member (24).

7. The adjustable retraction mechanism (10) according to claim 1, wherein the pressing member (24) is made of metal.

8. The adjustable retraction mechanism (10) according to claim 1, wherein the cord friction mechanism (22) comprises exactly two pressing members (24).

9. The adjustable retraction mechanism (10) according to claim 1, wherein the spring (14) is made of metal.

10. The adjustable retraction mechanism (10) according to claim 1, wherein the cord (16) is made of metal.

11. The adjustable retraction mechanism (10) according to claim 1, wherein the main housing (20) is made of plastic.

* * * * *